(No Model.)
E. OLIVER.
ANIMAL TRAP.
No. 363,536. Patented May 24, 1887.
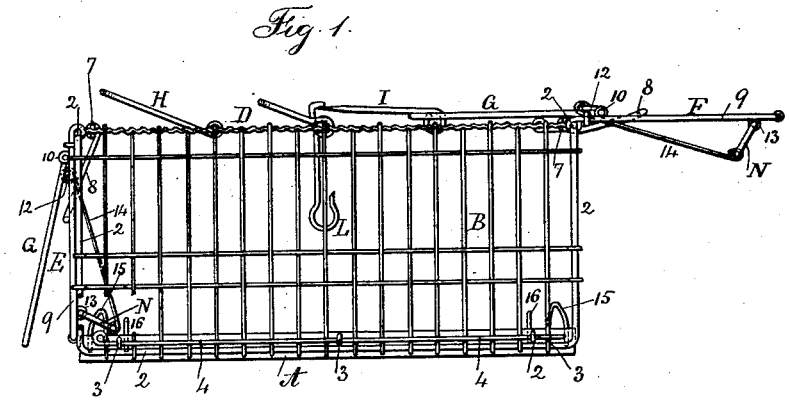
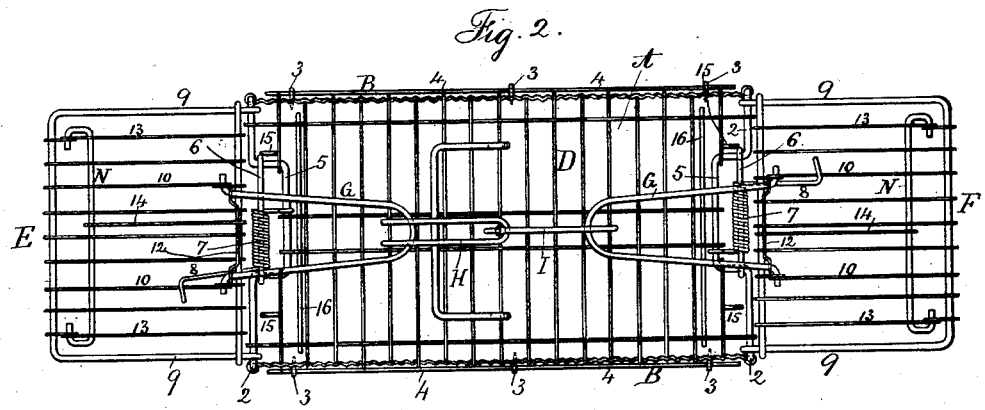
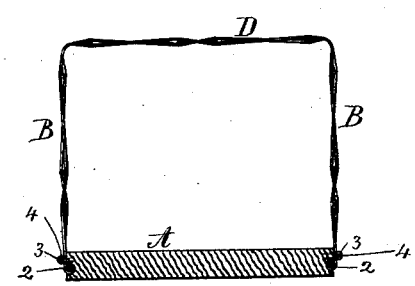
Witnesses:
J. Staib
Chas. H. Smith
Inventor:
Ebenezer Oliver
per Lemuel W. Serrell
Atty

UNITED STATES PATENT OFFICE.

EBENEZER OLIVER, OF NEW YORK, N. Y., ASSIGNOR TO W. SHEPARD ESTEY, OF JERSEY CITY, NEW JERSEY.

ANIMAL-TRAP.

SPECIFICATION forming part of Letters Patent No. 363,536, dated May 24, 1887.

Application filed October 16, 1886. Serial No. 216,429. (No model.)

*To all whom it may concern:*

Be it known that I, EBENEZER OLIVER, of the city and State of New York, have invented an Improvement in Animal-Traps, of which the following is a specification.

Animal-traps have been made with a wooden base and sides and top of open wire-work, and with hinged end doors or gates held up by latches and closed with springs, and the end gates have been caught by latches.

My improvements relate to the devices for connecting the bottom parts of the wire sides to the base, so that they can be easily separated and the wire-work nested into a small space for transportation; also, to the locking devices that hold the end doors when closed, so that the rat cannot force the same open or unlatch the parts in his efforts to escape.

In the drawings, Figure 1 is a side view of the rat-trap with one end gate open and the other shut, some of the side wires being removed to show the parts more clearly. Fig. 2 is a plan with both gates open, and Fig. 3 is a cross-section of the wire-work and base.

The base A is of wood, as usual, and the sides B and top D are of wire-work interwoven in any ordinary manner. The wire 2 is heavier than the other wires, and extends along the bottom edges and ends of the sides and across at the end portions of the top. The edges of the base-board A are grooved for the reception of the wire 2, and there are double-pointed tacks or staples 3 inserted into the base-board above this wire and between the cross-wires of the sides, and the fastening-wires 4 are run through these staples to hold the lower parts of the sides B firmly to the base A; but when these fastening-wires 4 are drawn out the wire portion of the trap is disconnected from the base, and the end doors of the trap, hereinafter described, can be swung in below the top D, and a number of the traps can be packed or nested together into a small space, the sides B springing outwardly at an inclination sufficiently for receiving between them the next trap; and usually one complete trap is packed with the parts of the others, so as to show how to put the parts together.

The edge wires 2, that extend around the sides and across the trap at the ends of the top, are bent inwardly at 5 to give the necessary space for the reception of the cross-wire 6 and helical spring 7, one arm of which helical spring is fastened to the wire 2, and the other arm, 8, acts upon the end door or gate to close the same. Similar wires and springs are provided at each end.

The end gates, E and F, are alike, and each is formed of a wire frame with cross-wires. The edge wire 9 is made with eyes around the wire 2, to form the hinges for the gate to swing upon as it is opened or closed.

The cross-wires 10 are made with eyes forming the pivots for the bail G, and when the gates are swung up and opened the bails G lie upon the top of the trap, and the loop H and latch-wire I are passed through the respective bails, and the catch upon the upper end of the hanging bait-hook L holds the latch-wire and keeps the doors open in the usual manner until the catch is unhooked from the latch-wire, and the end doors are closed by the springs.

In some instances latches have been used to hold the doors when closed, and guard-wires along the lower edge of the doors; but these are not reliable, and the trap is often forced open by the rat or other animal. To avoid this I connect with each bail-wire G a cross-wire, 12, forming a crank, and in the wires 13 are eyes that form hinges for the ends of the locking-wire N, that passes across the inner face of the door and is connected by a link, 14, to the crank-wire 12, and there are inclined stationary latches 15 at the ends of the base A, over which the locking-wires N pass and hold the doors securely when closed, and the stationary guard-wires 16 prevent the rat lifting the locking-wires.

When the bail-wires G are swung out previous to opening the end doors, the crank-wires 12, acting through the links 14, lift the locking-wires N above the latches 15, so that the gates are free to swing with their respective bails upon their hinge-eyes and assume a horizontal position, as represented by the gate F in Fig. 1, and the parts are then held by the loop-latch and bait-hook until the trap is sprung by the movement of the bait-hook.

I do not claim a trap having a wooden base grooved upon its edges and having stationary wires upon which the upper or wire portion of the trap can slide endwise upon the base, as this has been used.

I claim as my invention—

1. The combination, with the wire sides and top in an animal-trap, and the swinging end gates, of a base grooved on its edges for the reception of the edge wire at the bottoms of the sides, the staples in the edges of the base above the edge wire, and the movable fastening-wires passing through the staples, substantially as set forth.

2. The combination, with the base and the wire-work sides and top in an animal-trap, of end doors having eyes in the edge wires, forming hinges, the bail-wires pivoted in eyes in the cross-wires 10 of the gates, the crank-wires 12 upon the bail-wires, the locking-wires N, pivoted at their ends in eyes in the cross-wires 13 of the gates, the links 14, latches 15, and stationary guard-wires 16, substantially as set forth.

Signed by me this 11th day of October, A. D. 1886.

E. OLIVER.

Witnesses:
GEO. T. PINCKNEY,
WILLIAM G. MOTT.